UNITED STATES PATENT OFFICE.

THOMAS LEOPOLD WILLSON AND MAXIMILIAN MATTHEUS HAFF, OF OTTAWA, ONTARIO, CANADA; SAID HAFF ASSIGNOR TO SAID WILLSON.

METHOD OF DRYING MONOCALCIC PHOSPHATE AND THE LIKE.

1,040,081.  Specification of Letters Patent.  Patented Oct. 1, 1912.

No Drawing.  Application filed July 10, 1912. Serial No. 708,548.

*To all whom it may concern:*

Be it known that we, THOMAS LEOPOLD WILLSON and MAXIMILIAN MATTHEUS HAFF, both of the city of Ottawa, Province of Ontario, Dominion of Canada, have invented certain new and useful Improvements in Methods of Drying Monocalcic Phosphate and the Like, of which the following is the specification.

This invention relates to a method of drying monocalcic phosphate and the like, particularly to such phosphates as are prepared from natural phosphate rock by the addition of phosphoric acid, and the objects are to provide a simple and economical method by which the monocalcic phosphate may be changed from a more or less pasty condition to a powdered condition without affecting its relative solubility, and may at the same time be combined with nitrogen to render it more valuable as a fertilizer.

Ordinary monocalcic phosphate contains from 14 to 16% phosphoric acid and is in a comparatively dry state and suitable for use as a fertilizer. It is prepared usually by the addition of sulfuric acid to a natural phosphate rock. To obtain calcium phosphate compounds having a higher percentage of phosphoric acid, it is the practice to add the phosphoric acid itself to natural phosphate rocks, and the compounds produced containing from 20 to 60 per cent. of phosphoric acid ($P_2O_5$) are in a more or less moist or damp condition and unsuitable for handling as a fertilizer. The degree of moisture varies with the amount of free phosphoric acid ($P_2O_5$). It is not practicable to use ordinary drying methods with this highly concentrated compound for the reason that the cost of such operations would be far in excess of the added value given to the compound as a fertilizer.

According to the present invention, ammonia preferably in the form of dry gas, is introduced into the damp or pasty mass of monocalcic phosphate. The function of the ammonia is two fold. In the first place it increases the fertilizing properties of the compound, and in the second place the heat liberated by its reaction with the monocalcic phosphate dries the mass and expels any uncombined moisture.

In practising the invention we have found that a small amount, say 10 to 15% of ammonia as vapor is sufficient, the excess amounts varying according to the amount of free phosphoric acid ($P_2O_5$), the ammonia forming ammonium calcium phosphate and ammonium phosphate.

It will be seen that the fact that the reaction of the reagent ammonia with the compound monocalcic phosphate is exothermic causes any uncombined moisture in the mass to be expelled, thereby producing a commercially dry salt more adaptable for use as a fertilizer than the original moist or damp monocalcic phosphate. In addition to this a desirable quantity of nitrogen is introduced into the compound which increases its fertilizing value. The ammonium compound produced does not injuriously affect the solubility of the compound, as after treatment, it will still be found to be soluble in the standard ammonium citrate solution. It would appear that the method herein described of drying a fertilizing compound, and at the same time increasing its fertilizing value by the addition of nitrogen might be applied to other fertilizing compounds, provided that the reagents used do not produce any compounds which are undesirable for fertilizing purposes. It will be apparent that the ammonia will convert the free phosphoric acid ($P_2O_5$) into ammonium phosphate and this will also be present in the resultant compound of the final mass.

We are aware that it has already been proposed to absorb ammonia in an acid superphosphate of lime, but such superphosphate was prepared by the addition of sulfuric acid to phosphatic substances and consequently would not possess the high percentage of phosphoric acid nor the amount of moisture to correspond. The present invention contemplates solely the use of monocalcic phosphate or an equivalent compound which is prepared by the addition of phosphoric acid to natural phosphate rock. It may be stated that where phosphoric acid ($P_2O_5$) is referred to herein it may be used in the commercial form of liquid phosphoric acid.

What we claim as our invention is:

The herein described method of converting and drying a phosphate salt which has been prepared from natural phosphate rock by the addition of phosphoric acid which comprises introducing ammonia gas therein.

In witness whereof we have hereunto set our hands in the presence of two witnesses.

THOMAS LEOPOLD WILLSON.
MAXIMILIAN MATTHEUS HAFF.

Witnesses:
RUSSEL B. SMART,
D. C. A. RAYE.